(12) United States Patent
Kile

(10) Patent No.: US 10,321,633 B1
(45) Date of Patent: Jun. 18, 2019

(54) THRESHING BARS WITH REINFORCED SPIKES AND CUTTING BLADES

(71) Applicant: Ronald J. Kile, Rosalia, WA (US)

(72) Inventor: Ronald J. Kile, Rosalia, WA (US)

( * ) Notice: Subject to any disclaimer, the term of this patent is extended or adjusted under 35 U.S.C. 154(b) by 118 days.

(21) Appl. No.: 15/348,069

(22) Filed: Nov. 10, 2016

(51) Int. Cl.
*A01F 12/22* (2006.01)

(52) U.S. Cl.
CPC .................................. *A01F 12/22* (2013.01)

(58) Field of Classification Search
CPC .......... A01F 12/22; A01F 12/20; A01F 12/18; A01F 7/06; A01F 7/067; A01D 61/008
USPC ........................................................ 460/71
See application file for complete search history.

(56) References Cited

U.S. PATENT DOCUMENTS

| | | | | |
|---|---|---|---|---|
| 1,079,964 A * | 12/1913 | Vohland | ................... | A01F 12/22 460/122 |
| 1,341,230 A * | 5/1920 | Hamilton | ................ | A01F 12/22 460/121 |
| 1,355,509 A * | 10/1920 | Ross | ....................... | A01D 34/42 56/294 |
| 1,424,933 A * | 8/1922 | Owen | ..................... | A01F 12/22 460/122 |
| 1,705,810 A * | 3/1929 | Driest, Sr. | ............... | B26B 13/04 30/266 |
| 1,847,302 A * | 3/1932 | Emmons | ................. | B23B 51/02 175/426 |
| 2,894,583 A * | 7/1959 | Johnstad | ................... | B24D 5/12 188/106 R |
| 3,975,891 A * | 8/1976 | Gunther | .................. | A01D 34/73 56/295 |
| 4,248,248 A * | 2/1981 | De Busscher | .......... | A01F 12/22 460/68 |
| 4,250,896 A * | 2/1981 | Wagstaff | ................... | A01F 7/06 460/70 |
| 4,958,457 A * | 9/1990 | Doskocil | ................. | E02F 3/188 172/112 |
| 5,035,675 A * | 7/1991 | Dunn | ........................ | A01F 7/06 460/122 |
| 5,192,245 A * | 3/1993 | Francis | ..................... | A01F 7/06 460/110 |
| 5,297,637 A * | 3/1994 | Rowlett | ................. | A01B 15/18 172/555 |
| 5,906,053 A * | 5/1999 | Turner | .................... | A01D 34/73 30/347 |
| 6,067,784 A * | 5/2000 | Jordan | ................. | B23D 35/001 30/345 |
| 6,264,553 B1 * | 7/2001 | Neumann | ................. | A01F 7/06 460/71 |

(Continued)

*Primary Examiner* — Thomas B Will
*Assistant Examiner* — Joan D Misa
(74) *Attorney, Agent, or Firm* — Michael W. Goltry; Robert A. Parsons; Parsons & Goltry, PLLC

(57) ABSTRACT

A threshing bar includes a threshing fixture formed entirely of a first metal, and a head formed entirely of a second metal. The threshing fixture includes a leading extremity, a trailing extremity, a top threshing side, a bottom threshing drum emplacement side, and a spike. The spike projects from the top threshing side to the head affixed rigidly to the spike and which is available for threshing crop cuttings between the leading and trailing extremities. The first metal has a first tensile strength, the second metal has a second tensile strength, and the second tensile strength is greater than the first tensile strength.

4 Claims, 12 Drawing Sheets

(56) References Cited

U.S. PATENT DOCUMENTS

| | | | | |
|---|---|---|---|---|
| 6,325,714 B1* | 12/2001 | Tanis | ............... | A01F 12/22 460/71 |
| 6,427,572 B2* | 8/2002 | Ciani | ............... | B26D 1/0006 83/663 |
| 6,857,255 B1* | 2/2005 | Wilkey | ............... | A01D 34/13 56/296 |
| 7,632,182 B2* | 12/2009 | Farley | ............... | A01F 12/22 460/122 |
| 8,087,982 B1* | 1/2012 | Kile | ............... | A01F 12/22 460/71 |
| 8,505,414 B2* | 8/2013 | Culf | ............... | B23D 65/00 76/101.1 |
| 8,529,325 B2* | 9/2013 | Kile | ............... | A01F 12/20 460/71 |
| 9,089,094 B1* | 7/2015 | Kile | ............... | A01F 12/00 |
| 9,675,010 B2* | 6/2017 | McLawhorn | ............... | A01F 29/09 |
| 9,807,939 B1* | 11/2017 | Kile | ............... | A01F 12/22 |
| 2014/0045562 A1* | 2/2014 | Adamczyk | ............... | A01F 12/40 460/112 |
| 2015/0319923 A1* | 11/2015 | Stoffel | ............... | A01D 34/736 56/255 |
| 2016/0157423 A1* | 6/2016 | Stoffel | ............... | A01F 29/09 148/525 |

* cited by examiner

THRESHING BARS WITH REINFORCED SPIKES AND CUTTING BLADES

FIELD OF THE INVENTION

The present invention relates to combine harvesters.

More particularly, the present invention relates to combine harvester threshers.

In a further and more specific aspect, the present invention relates to threshing bars of combine harvester threshers.

BACKGROUND OF THE INVENTION

A combine harvester includes a header, a pickup reel, a cutter, a threshing drum, sieves, a collection tank, and conveyors, such as rotating belts and spinning augers and fans. The header gathers the crop, and the pickup reel pushes the crop down toward the cutter, which cuts the crop at the base near ground level. A conveyor picks up the cuttings from the cutter, and conveys the cuttings to the threshing drum, which rotates and threshes the cuttings separating the grains from the chaff to form threshings, namely, the chaff and the separated grains. A conveyance conveys the threshings along the thresher from an upstream location of thresher to a downstream location of thresher as the thresher rotates and the grains fall through sieves into a collection tank inside the combine harvester, which is periodically emptied, such as into tractors that drive alongside, while a conveyor takes up and conveys the chaff to the ejection spout for ejection onto the field. Some combine harvesters have a rotating spreader mechanism that throws the chaff over a wide area, while others have bailers that bail the chaff for later use, such as for animal bedding.

Typically, a number of threshing bars are secured to the outer surface of the threshing drum. As the threshing drum rotates, the threshing bars thresh the crop material between the outer surface of the threshing drum and the concave.

Threshing bars inherently wear over time, which inherently diminishes the ability of the threshing bars to efficiently thresh the crop material compared to unworn threshing bars. Threshing bars must, therefore, be periodically replaced when worn.

Some threshing bars incorporate raised spikes or cutting blades useful for threshing crops such as rice and other crops having inherently tough straw. These spikes and cutting blades inherently dull and wear over time, typically at a rate that is faster than the remaining threshing bar threshing surfaces due to their exposure. As a result, threshing bars having raised spikes and cutting blades must be replaced sooner compared to threshing bars having no such spikes or cutting blades. Accordingly, there is a need in the art for threshing bars having spikes or cutting blades configured to resist wear from prolonged use for reducing the frequency of threshing bar replacement until the remaining threshing surfaces become sufficiently worn to require bar replacement.

SUMMARY OF THE INVENTION

According to the principle of the invention, a threshing bar includes a threshing fixture formed entirely of a first metal, and a head formed entirely of a second metal. The threshing fixture includes a leading extremity, a trailing extremity, a top threshing side, a bottom threshing drum emplacement side, and a spike that projects from the top threshing side to a leading end between the leading and trailing extremities. The head is affixed rigidly to the leading end of the spike. The head is between the leading extremity of the threshing fixture and the leading end of the spike to be available for spike-threshing crop cuttings between the leading and trailing extremities. The first metal has a first tensile strength. The second metal is different from the first metal and has a second tensile strength. The second tensile strength is greater than the first tensile strength. The head is fitted into a notch formed in the leading end of the spike. The first metal is cast iron. The second metal is tungsten carbide.

According to the principle of the invention, a threshing bar includes a threshing fixture formed entirely of a first metal, and a head formed entirely of a second metal. The threshing fixture includes a leading extremity, a trailing extremity, a top threshing side, a bottom threshing drum emplacement side, and a spike having a first cutting edge. The spike projects from the top threshing side and includes opposite sides that extend forwardly toward the leading extremity to the first cutting edge between the leading and trailing extremities. The head has a second cutting edge, and is affixed rigidly to one of the opposed sides of the spike. The head extends forwardly along the one of the opposed sides of the spike toward the leading extremity to the second cutting edge between the leading and trailing extremities. The first and second cutting edges cooperate to form an aggressive cutting edge available for cutting crop cuttings between the leading and trailing extremities. The first metal has a first tensile strength. The second metal is different from the first metal and has a second tensile strength. The second tensile strength is greater than the first tensile strength. The head is fitted into a notch formed in the one of the opposed sides of the spike. The first metal is cast iron. The second metal is tungsten carbide.

BRIEF DESCRIPTION OF THE DRAWINGS

Referring to the drawings.

DETAILED DESCRIPTION

Figure 1:
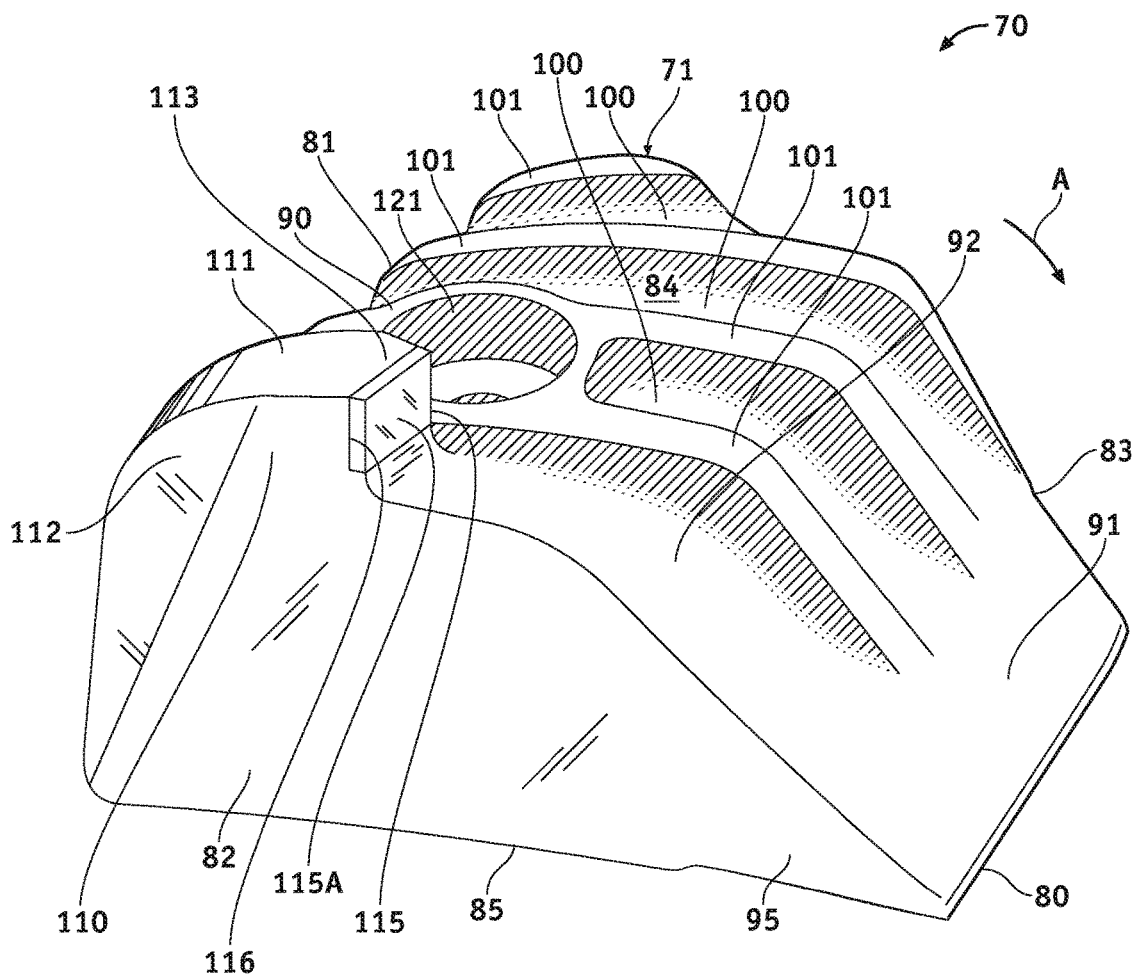
FIG. 1 is a front perspective view of a threshing bar according to the invention.

In general, a combine harvester includes a header, a pickup reel, a cutter, a conveyer formed between the cutter and the thresher, a thresher including a threshing drum having a cylindrical exterior configured with threshing bars, a concave under the thresher, sieves, a collection tank, and an array of conveyors, such as rotating belts and spinning augers and fans. In the operation of a combine harvester as it is driven through a crop to be harvested, the header gathers the crop, and the pickup reel applies the crop to the cutter, which cuts the crop at the base near ground level to form crop cuttings or, simply, cuttings. The conveyor picks up the cuttings from the cutter, and conveys the cuttings to the thresher for threshing. The thresher rotates and the threshing bars thresh the cuttings along the thresher concave separating the grains from the chaff to form threshings, namely, the chaff and the separated grains. The grains fall through the sieves into the collection tank inside the combine harvester, which is periodically emptied, such as into tractors that drive alongside, while a conveyor takes up and conveys the chaff to an ejection spout for ejection onto the field. Disclosed herein are improved threshing bars useful with a threshing drum.

Turning now to the drawings, in which like reference characters indicate corresponding elements throughout the several views, FIGS. 1-8 illustrate a threshing bar 70 constructed and arranged according to the invention. Looking briefly to FIGS. 9 and 10, a thresher 50 includes a threshing drum 60 having a cylindrical outer surface or exterior 61 configured with threshing bars 70. Threshing drum 60 is mounted for rotation relative to a thresher concave 51 in a threshing direction, or threshing direction of rotation, generally indicated by arrowed line A. Arrowed line A indicates the direction of rotation of threshing drum 60, which is the direction of travel of threshing bars 70 applied to threshing drum 60. A population of threshing bars 70, each constructed and arranged in accordance with the principle of the invention, is affixed to cylindrical exterior 61 of threshing drum 60 for threshing a crop applied between cylindrical exterior 61 of threshing drum 60 and thresher concave 51 in response to rotation of threshing drum 60 in the threshing direction indicated by arrowed line A. Threshing bars 70 thresh the crop cuttings between cylindrical exterior 61 and thresher concave 51 separating the grains from the chaff to form threshings, namely, the chaff and the separated grains, when threshing drum 60 rotates in the threshing direction. The separated grains fall through sieves and are applied into the collection tank inside the combine harvester, which, again, is periodically emptied, such as into tractors that drive alongside, while a conveyor takes up and conveys the chaff to an ejection spout for ejection onto the field.

Figure 2:
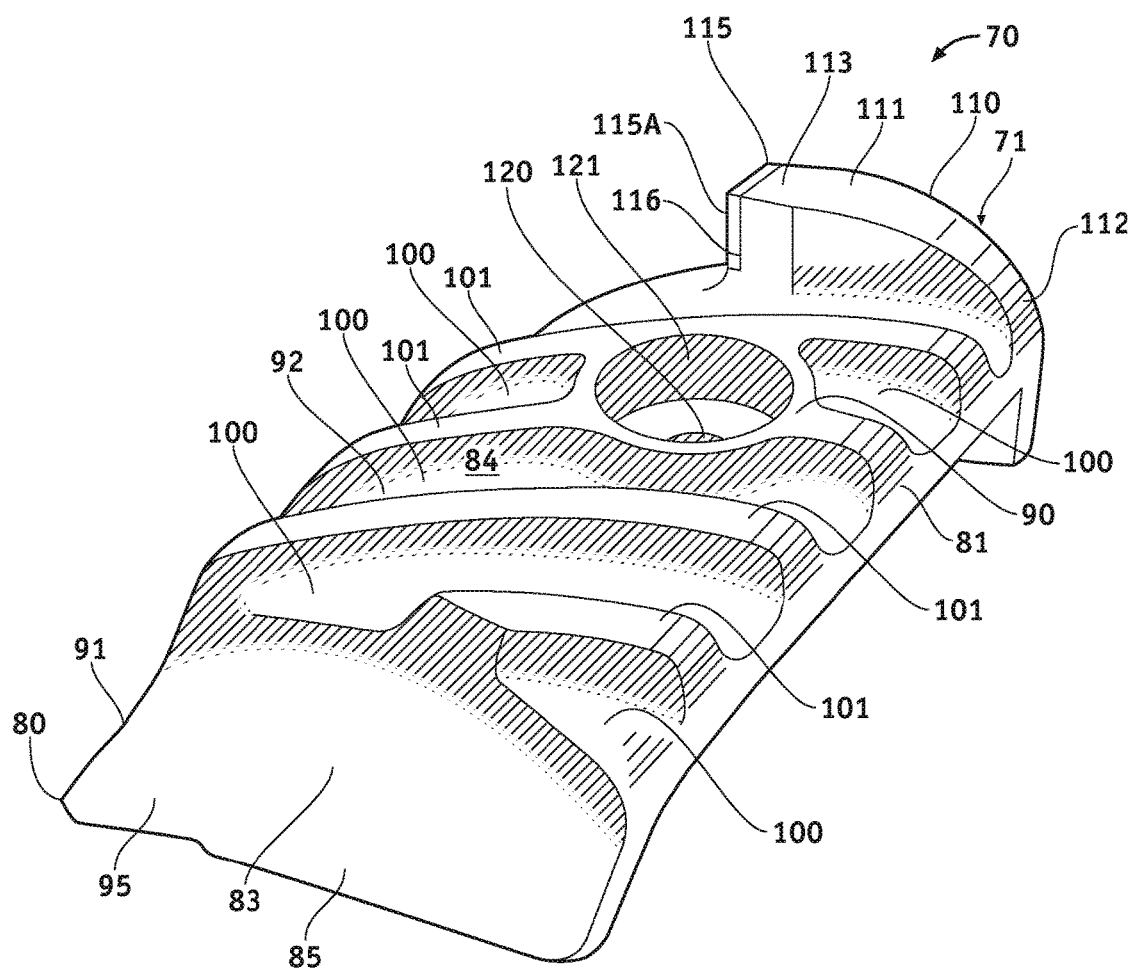
FIG. 2 is a rear perspective view of the embodiment of FIG. 1.
Figure 3:
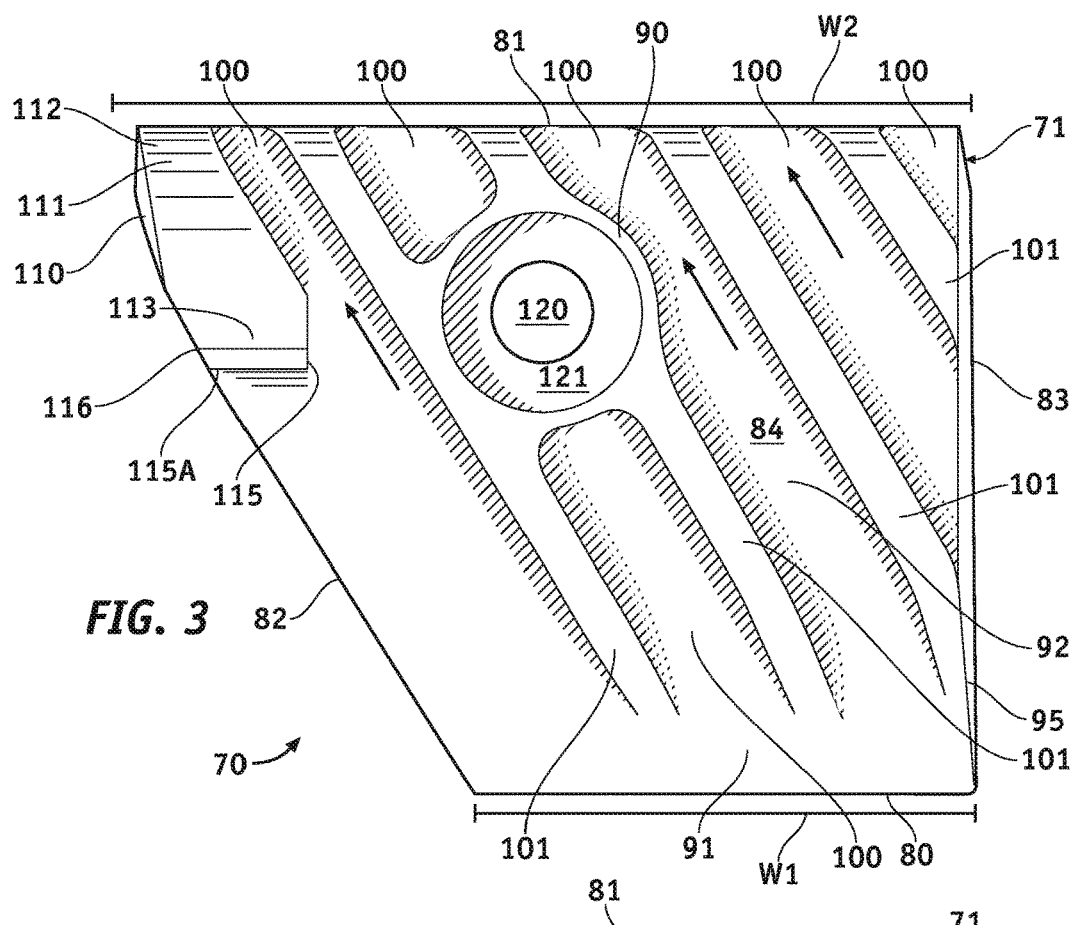
FIG. 3 is a top plan view of the embodiment of FIG. 1.
Figure 4:
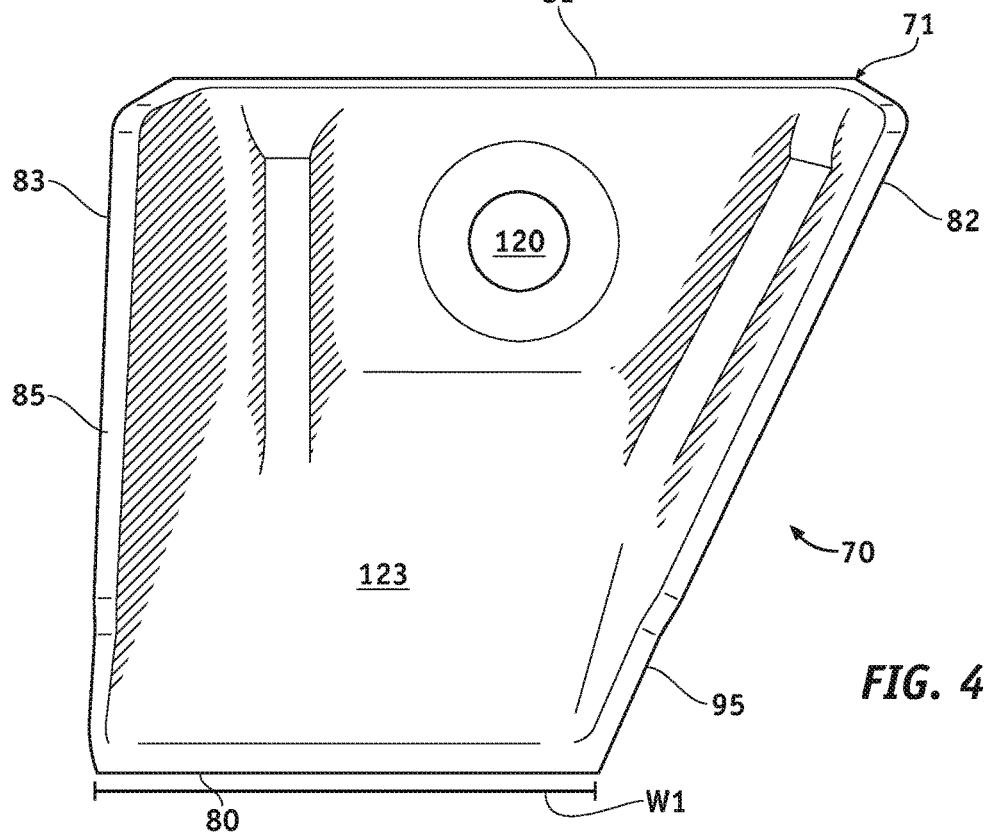
FIG. 4 is a bottom plan view of the embodiment of FIG. 1.
Figure 5:
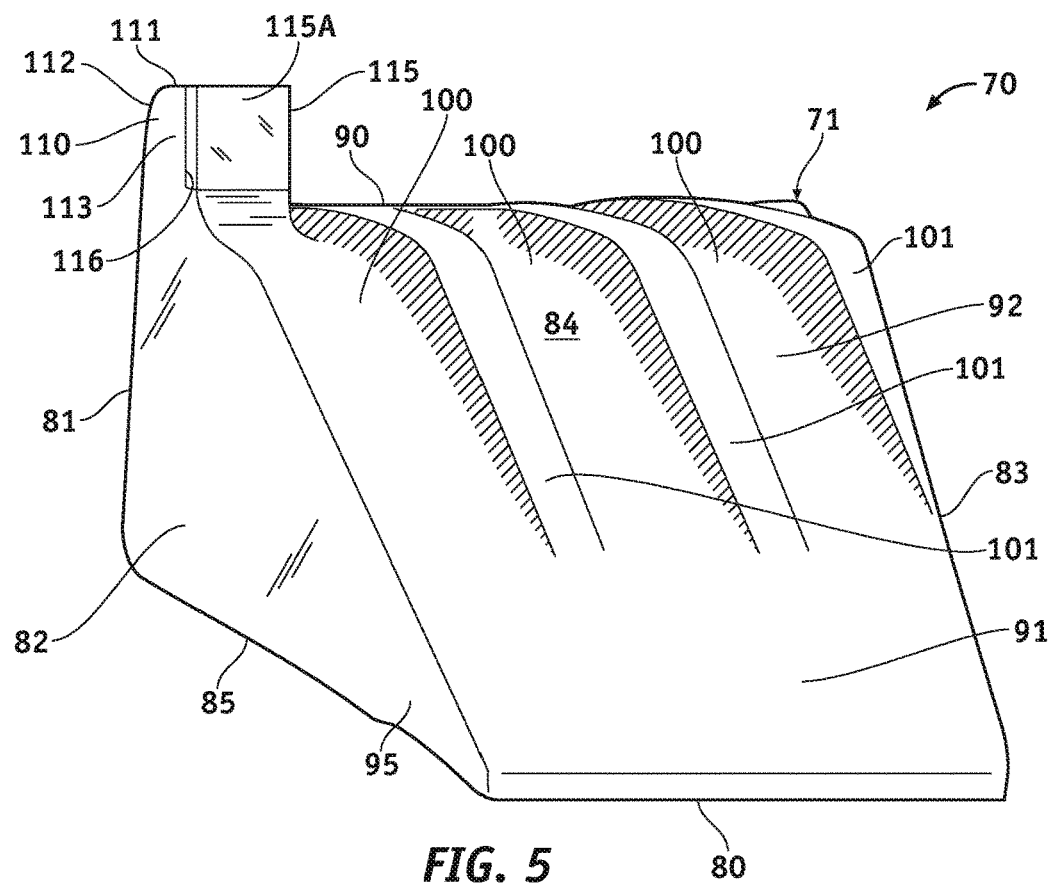
FIG. 5 is a front elevation view of the embodiment of FIG. 1.
Figure 6:
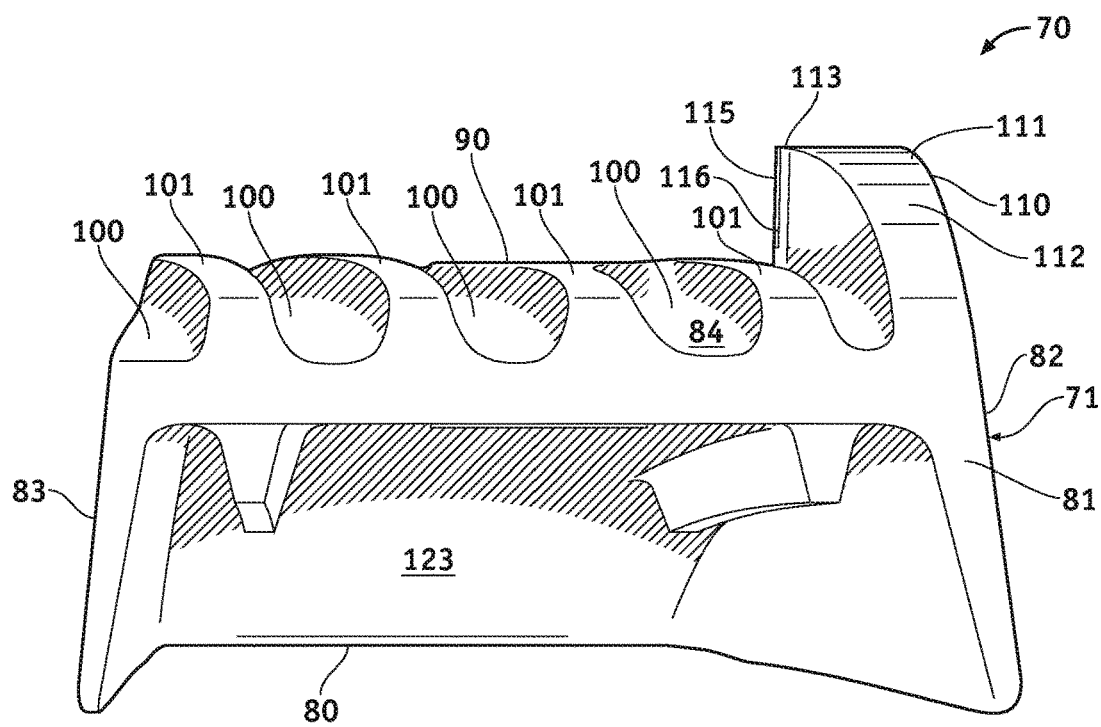
FIG. 6 is a rear elevation view of the embodiment of FIG. 1.
Figure 7:
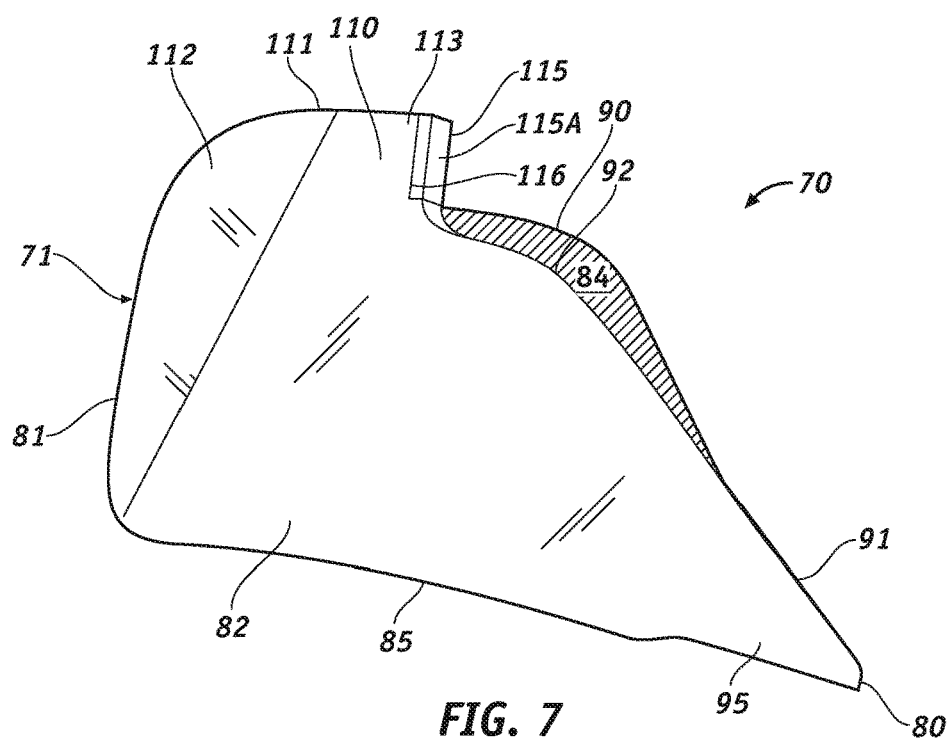
FIG. 7 is a right side elevation view of the embodiment of FIG. 1.
Figure 8:
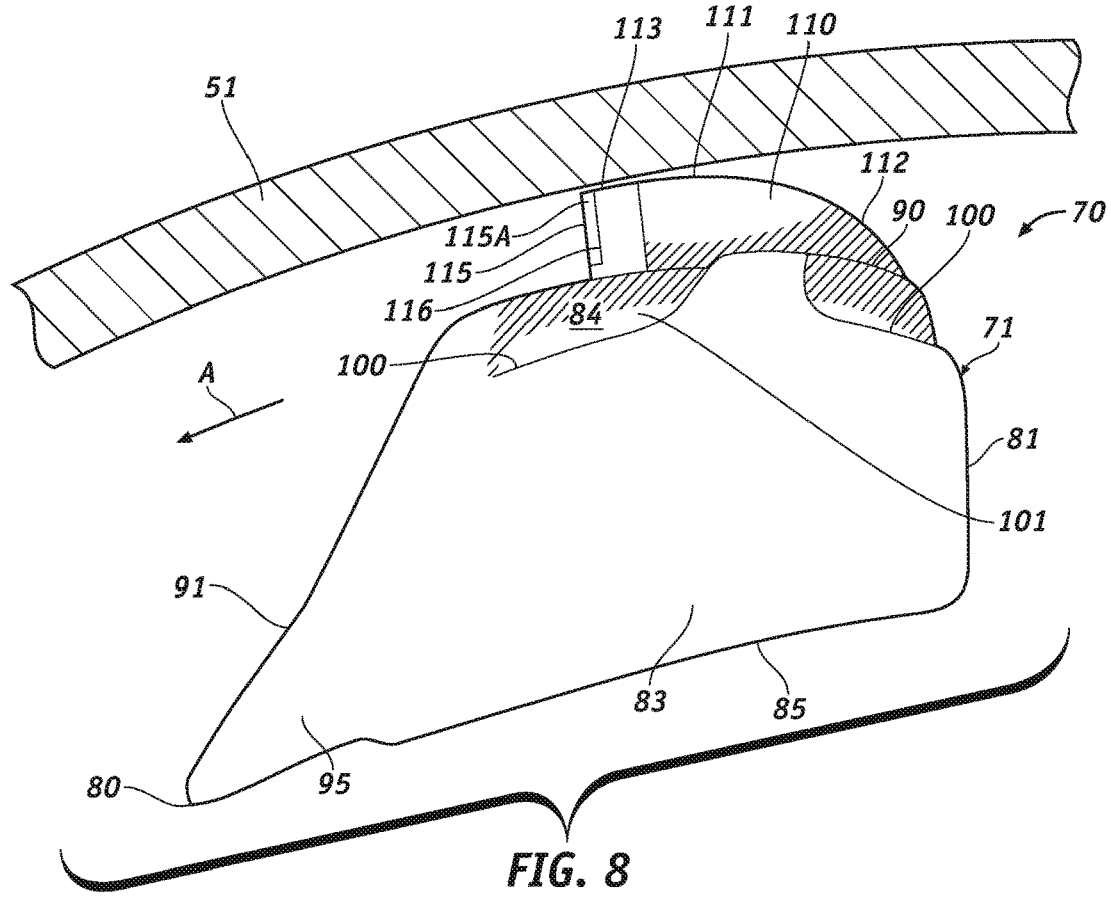
FIG. 8 is a left side elevation view of the embodiment of FIG. 1 shown as it would appear operatively positioned adjacent to a section view of a thresher concave.
Figure 9:
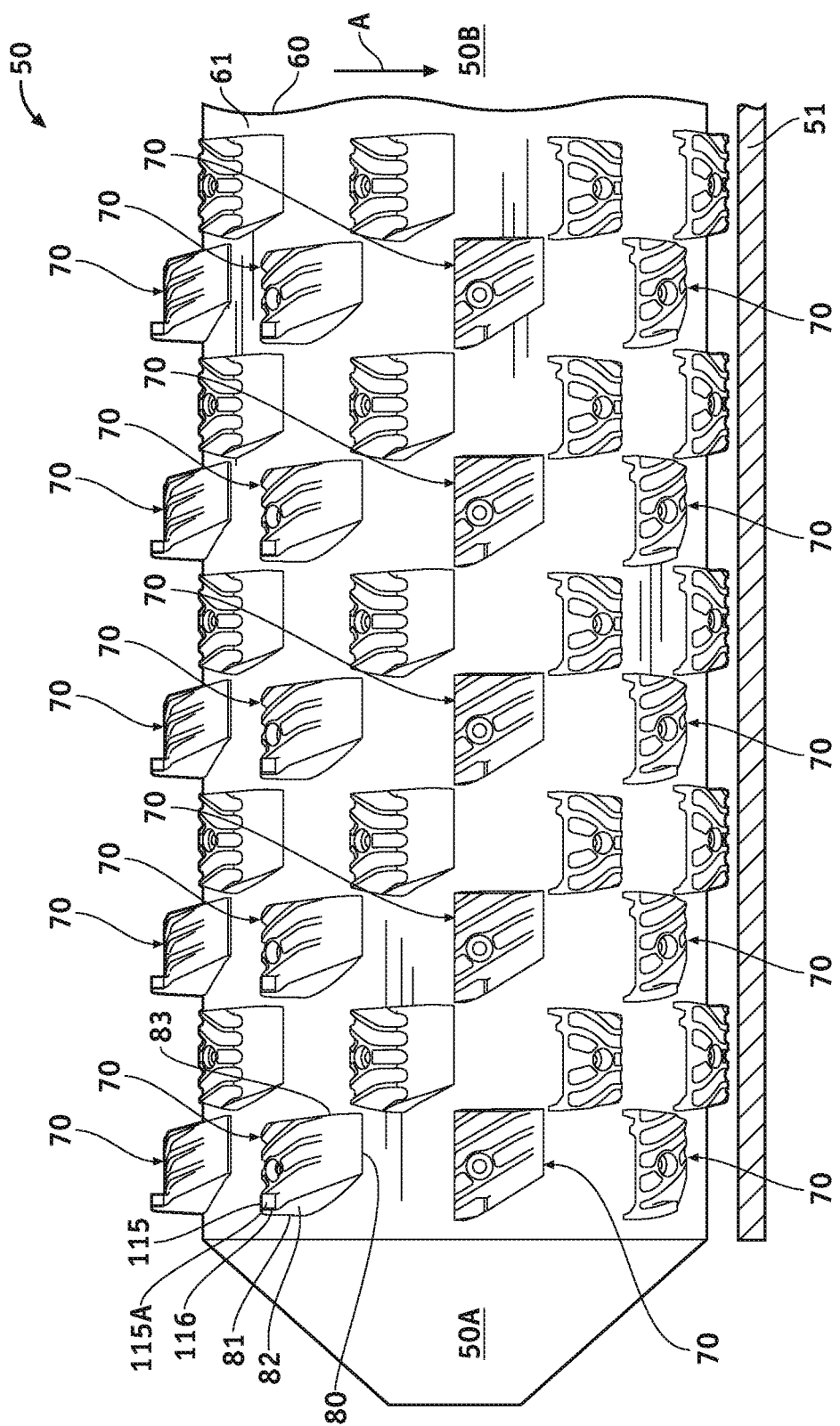
FIG. 9 is a fragmented, front elevation view of a thresher, including a threshing drum formed with threshing bars each according to the embodiment of FIG. 1, operatively positioned adjacent to a section view of a thresher concave.
Figure 10:
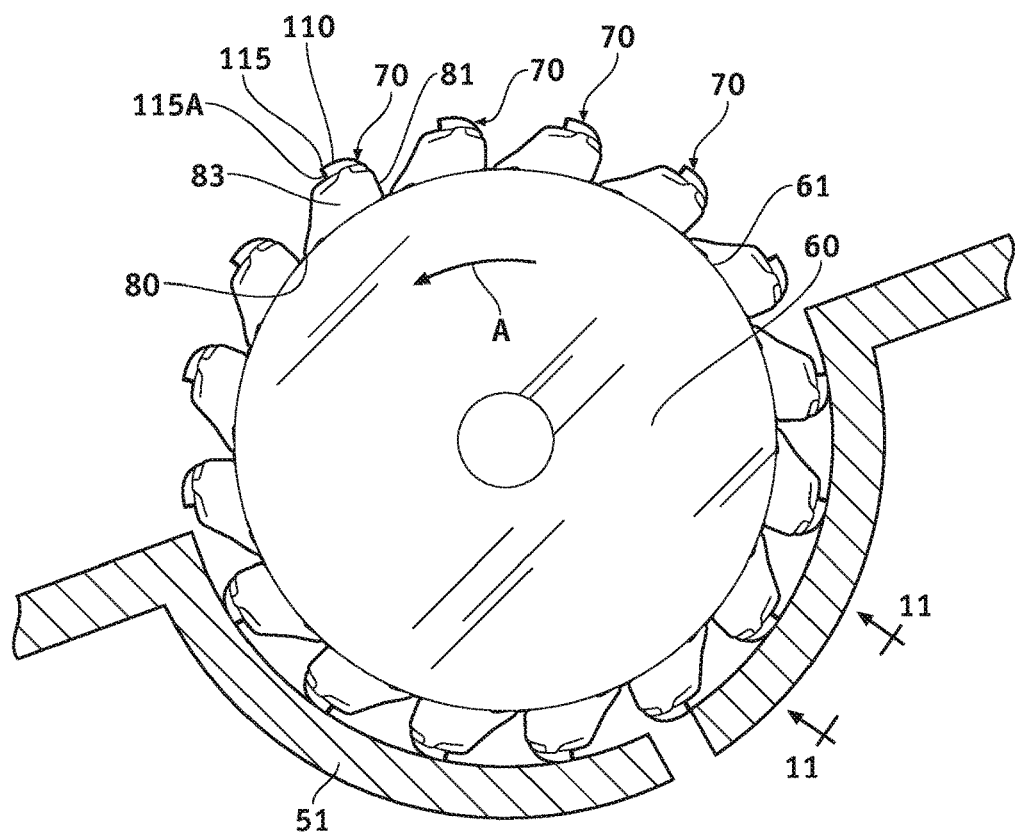
FIG. 10 is an enlarged, highly generalized side elevation view of the thresher and the thresher concave of FIG. 9.

FIG. 1 is a front perspective view of threshing bar 70, a population of which in a particular embodiment is applied to cylindrical exterior 61 of threshing drum 60 being then part of thresher 50 forming an exemplary thresher embodiment of the invention in FIGS. 9 and 10. FIG. 2 is a rear perspective view of threshing bar 70, FIG. 3 is a top plan view of threshing bar 70, FIG. 4 is a bottom plan view of threshing bar 70, FIG. 5 is a front elevation view of threshing bar 70, FIG. 6 is a rear elevation view of threshing bar 70, FIG. 7 is a left or upstream side elevation view of threshing bar 70, and FIG. 8 is a right or downstream side elevation view of threshing bar 70 shown as it would appear operatively positioned with respect to a section view of thresher concave 51.

Referencing FIGS. 1-8 in relevant part, threshing bar 70 consists of a rigid, integral, unitary threshing body or fixture 71, which is formed, such as by molding or machining, entirely of a metal. The metal of fixture 71 is cast iron, specifically grey cast iron having an inherent tensile strength. Threshing fixture 71 has a leading edge 80 defining a leading extremity of threshing fixture 71 and an opposed trailing end or extremity 81, opposed outer or end faces/surfaces 82 and 83, a top threshing side 84 and an opposed bottom threshing drum emplacement side 85. Leading edge 80 is parallel with respect to trailing end 81. Leading edge 80 has a width W1 that extends from end face 82 to end face 83, and trailing end 81 has a width W2 that extends from end face 82 to end face 83.

Outer or end face 82 is at the upstream side of threshing fixture 71 and is considered the upstream face/surface of threshing fixture 71. Outer or end face 83 is at the downstream side of threshing fixture 71 and is considered the downstream face/surface of threshing fixture 71. End face 82 on the upstream side of threshing fixture 71 extends between top threshing side 84 and opposed bottom threshing drum emplacement side 85 of threshing fixture 71 from leading edge 80 of threshing fixture 71 to trailing end 81 of threshing fixture 71. End face 83 on the downstream side of threshing fixture 71 extends between top threshing side 84 and opposed bottom threshing drum emplacement side 85 of threshing fixture 71 from leading edge 80 of threshing fixture 71 to trailing end 81 of threshing fixture 71.

Top threshing side 84 has a crop-threshing rasp structure. Top threshing side 84 includes two main surface or face components, namely, a rearward trailing threshing surface or face denoted at 90 and a forward leading threshing surface or face denoted at 91. Trailing threshing face 90 meets leading threshing face 91 at a corner 92 formed in top threshing side 84, which means that trailing threshing face 90 is contiguous with leading threshing face 91 in that trailing threshing face 90 touches leading threshing face 91 at, and along the length of, corner 92. Corner 92 is rounded and blunt in this example, being not sharp, is located between, and is parallel with respect to, leading edge 80 and trailing end 81 of threshing fixture 71, and extends along top threshing side 84 from end face 82 to end face 83. Trailing threshing face 90 is a working, threshing, or rasping face and is broad and exposed and extends between opposed end faces 82 and 83 of threshing fixture 71 from trailing end 81 to corner 92. Leading threshing face 91 is a working, threshing, or rasping face and is broad and exposed like trailing threshing face 90, and extends between opposed end faces 82 and 83 of threshing fixture 71 from corner 92 to leading edge 80. Leading and trailing threshing faces 90 and 91 intersect at corner 92. Leading threshing face 91 inclines downwardly away from and relative to trailing threshing face 90 from corner 92 at an average downward incline of 40 degrees and meets, and cooperates with, bottom threshing drum emplacement side 85 and opposed end faces 82 and 83 of threshing fixture 71 at leading edge 80 to form a wedge 95 in threshing fixture 71, which characterized the forward or leading end of threshing fixture 71 opposing trailing end

81 of fixture 71. In the preferred embodiment leading threshing face 91 inclines downwardly from and relative to trailing threshing face 90 from corner 92 at an average incline of 40 degrees and this is an optimal incline of leading threshing face 91 for providing an optimum threshing action along leading threshing face 91. According to the principle of the invention, a preferred range of average inclination of leading threshing face 91 relative to trailing threshing face 90 is from 35 degrees to 45 degrees.

End face 82 extends between trailing and leading threshing faces 90 and 91 of top threshing side 84 and bottom threshing drum emplacement side 85 of threshing fixture 71 from trailing end 81 to leading edge 80, tapers from corner 92 to leading edge 80, and is in-turned or otherwise angled inwardly in the direction of end face 83 from trailing end 81 to leading edge 80 of threshing fixture 71 forming an oblique crop material deflecting surface of threshing fixture 71, namely, the end face 82 of threshing fixture 71 that is in-turned or otherwise inwardly-angled toward end face 83. Width W2 of trailing end 81 is greater than width W1 of leading edge 80. In an illustrative embodiment, end face 82 is in-turned from and relative to trailing end 81 at an average in-turn or angle of 30 degrees and this provides an optimum deflecting action along end face 82. A preferred range of an average in-turn or angle of end face 82 relative to trailing end 81 is from 20 degrees to 35 degrees.

A rasp structure is formed in and along trailing and leading threshing faces 90 and 91 of top threshing side 84 of threshing fixture 71. This rasp structure consists of alternating crop threshing grooves 100 and vanes 101. Crop threshing grooves 100 are formed in top threshing side 84 of threshing fixture 71, which form and are separated by corresponding upstanding vanes 101. Vanes 101 are elongate and have an equal and generally uniform height and width relative to each other, and grooves 100 are similarly elongate and correspond in length to the lengths of the corresponding vanes 101 and have a generally equal and uniform width and depth relative to each other. Grooves 100 and corresponding vanes 101 are formed in trailing threshing face 90 of top threshing side 84 of threshing fixture 71 and are formed in leading threshing face 91 of top threshing side 84 of threshing fixture 71. Grooves 100 and corresponding vanes 101 extend along threshing fixture 71 in a direction from trailing end 81 of threshing fixture 71 to leading edge 80 of threshing fixture 71. More specifically, grooves 100 and corresponding vanes 101 further extend along top threshing side 84 of threshing fixture 71 from trailing end 81 of threshing fixture 71 to corner 92 formed in top threshing side 84 of threshing fixture 71. Grooves 100 and corresponding vanes 101 further extend downwardly along leading threshing face 91 of top threshing side 84 of threshing fixture 71 from corner 92 and, in the present embodiment, terminate along leading threshing face 91 at an intermediate location relative to corner 92 and leading edge 80 of threshing fixture 71.

Grooves 100 and corresponding vanes 101 are parallel relative to each other, and are substantially parallel relative to the oblique crop material deflecting surface of threshing fixture 71, namely, end face 82 of threshing fixture 71, and are oblique relative to leading edge 80 of threshing fixture 71. As such, grooves 100 and corresponding vanes 101 are downstream directed grooves and vanes in that they are angled toward end face 83 at the downstream side of threshing fixture 71. Grooves 100 and corresponding vanes 101 forming the rasp structure of threshing fixture 71 define crop material conveyance pathways that extend along or otherwise across top threshing side 84 of fixture 71 in the opposite direction along threshing fixture 71 being a direction from leading edge 80 to trailing end 81 and, more particularly, in an angled direction relative to end face 83 of fixture 71 toward trailing end 81 of fixture 71. Grooves 100 and corresponding vanes 101 are substantially parallel relative to the oblique crop material deflecting surface defined by end face 82 of threshing fixture 71, in which the term "substantially parallel" means parallel within a deviation range of from zero to approximately 6 degrees. And so within this range of deviation, grooves 100 and corresponding vanes 101 are substantially parallel relative to the oblique crop material deflecting surface of threshing fixture 71, namely, end face 82 of threshing fixture 71.

Referring to FIGS. 1-8 in relevant part, threshing bar 70 is a spiked threshing bar in that it is formed with a spike 110 for threshing crop cuttings, specifically between corner and trailing end 81. Spike 110 is formed in threshing fixture 71. Spike 110 projects or otherwise extends outwardly from top threshing side 84 of threshing fixture 71 relative to the rasp structure formed in top threshing side 94, grooves 100 and vanes 101 in this example, to top 111. More specifically, spike 110 projects or otherwise extends outwardly from trailing threshing face 90 relative to the rasp structure formed in trailing and leading faces 90 and 91 to top 111, from trailing end 81 to an intermediate location between trailing end 81 and corner 92 so as to be available for threshing crop cuttings between upstream and trailing ends 80 and 81 and, more particularly, between trailing end 81 and corner 92.

Spike 110 is parallel with respect to end face 82 and end face 83. Spike 110 is formed at and along end face 82 of threshing fixture 71. Spike 110 has a rearward or trailing end 112, and an opposed forward or leading end 113. Trailing and leading ends 112 and 113 are integral with one another and are integrally formed with threshing fixture 71 and together project from top threshing side 84 of threshing fixture 71 to top 111. Trailing and leading ends 112 and 113 are formed along trailing threshing face 90 of top threshing side 84 of threshing fixture 71, and project outwardly from, or otherwise with respect to, trailing threshing face 90 from trailing end 112 proximate to trailing end 81 to leading end 113 at an intermediate location between trailing end 81 and corner 92. Accordingly, leading end 113 is between leading edge 80 and trailing end 81, and, more specifically, between trailing end 81 and corner 92, and projects outwardly from trailing threshing face 90 to top 111.

Threshing bar 70 further includes a head 115. Head 115 is formed entirely of a metal that is not only different from the metal of fixture 71 but that also has an inherent tensile strength that is greater than the inherent tensile strength of the metal that forms the entirety of fixture 71. As explained above, the metal that forms the entirety of fixture 71 is cast iron, specifically grey cast iron having an inherent tensile strength of from 200 MPa to 300 MPa. The metal that forms the entirety of head 115 is tungsten carbide having an inherent tensile strength of 344 MPa. Accordingly, the inherent tensile strength of head 115, specifically the metal that forms the entirety of head 115, is greater than the inherent tensile strength of fixture 71, specifically the metal that forms the entirety of fixture 71.

Head 115 is affixed rigidly to leading end 113 of spike 110 and is between leading edge 80 and leading end 113, and more particularly between corner 92 and leading end 113, to be available for spike-threshing crop cuttings bluntly between leading edge 80 and trailing end 81, more particularly between leading edge 80 and leading end 113, and, still more particularly between corner 92 and leading end 113.

Head 115, a thin, flat body, is affixed rigidly to leading end 113 via welding and completely covers the portion of leading end 113 to which it is rigidly affixed. In this example, head 115 is fitted into notch 116 formed in leading end 113 of spike 110, and is affixed rigidly to notch 116 of leading end 113 via welding.

Head 115, a threshing element, held by spike 110 is directed outwardly from trailing threshing face 90 and forwardly in a direction toward corner 92 and leading edge 80 of threshing fixture 71 and away from trailing end 81 of threshing fixture 71 so as to be available for threshing crop cuttings between not only leading and trailing ends 80 and 81 of fixture 71, but more specifically between corner 92 and trailing end 81 proximate to trailing threshing face 90. Head 115 defines a blunt threshing surface 115A. Head 15 leads with threshing surface 115A. Accordingly, threshing surface 115A is a leading threshing surface 115A. In this example, threshing surface 115A is a flat or otherwise planar surface, and is not sharp, as in a cutting edge, and this characterizes the blunt characteristic of threshing surface 115A. Because head 115 is affixed rigidly to leading end 113 of spike 110 and because spike 110 leads with blunt threshing surface 115A, spike 110 is a blunt crop-threshing spike configured to spike-thresh crop cuttings via threshing surface 115A of head 115.

Figure 11:
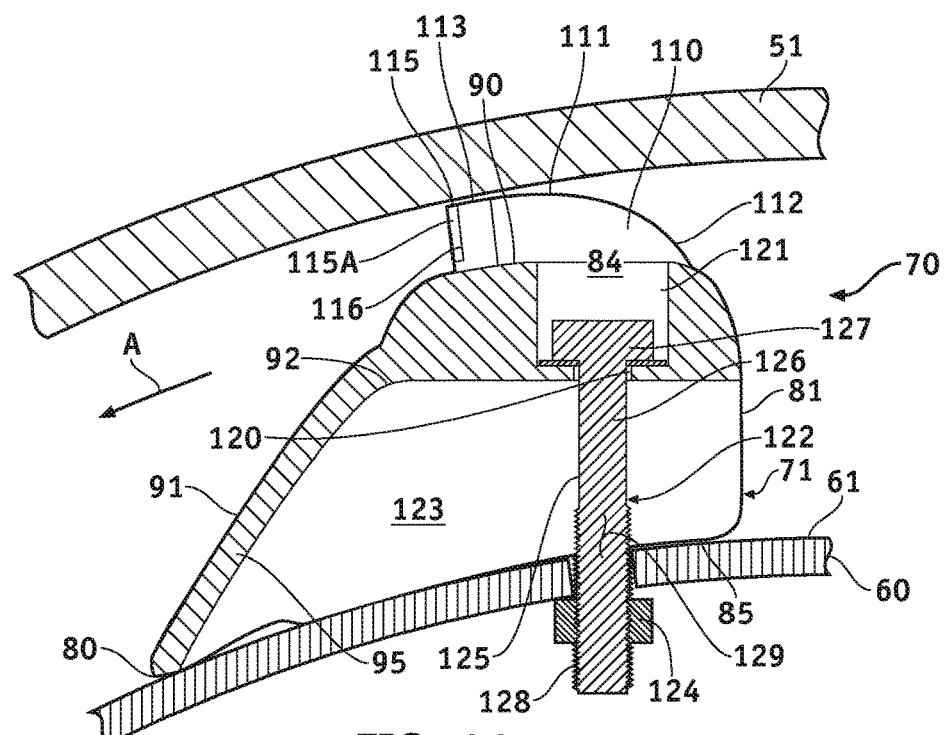
FIG. 11 is a section view taken along line 11-11 of FIG. 10.

In FIGS. 3, 4, and 11, threshing fixture 71 is formed with bore 120 and a corresponding counterbore 121 used to accept, as shown in FIG. 11, a nut-and-bolt fastener 122 for securing threshing bar 70 to cylindrical exterior 61 of threshing drum 60 in FIG. 11. Bore 120 and corresponding counterbore 121 are formed at an intermediate location between end face 82 and end face 83. Bore 120 and corresponding counterbore 121 are located at an intermediate location between corner 92 and trailing end 81 of threshing fixture 71, and extend through fixture 71 from trailing threshing face 90 of top threshing side 84 of threshing fixture 71 to a cavity 123 formed in bottom threshing drum emplacement side 85 of threshing fixture 71. Counterbore 121 is directed inwardly to bore 120 through trailing threshing face 90 of top threshing side of threshing fixture 71.

In FIG. 11, nut-and-bolt assembly 122 consists of nut 124 and a corresponding bolt 125 that includes an elongate shank 126 having a head 127 and an opposed threaded end 128. In the installation of threshing bar 70, bottom threshing drum emplacement side 85 of threshing bar 70 is set onto cylindrical exterior 61 of threshing drum 60, and threshing side 84 of threshing bar 70 and the rasp structure formed therein faces outwardly toward and confronts thresher concave 51. Threshing bar 70 is positioned so as to direct leading edge 80 and leading threshing face 91 and threshing surface 115A of spike 100 into the threshing direction of rotation of threshing drum 60 indicated by arrowed line A, so as to direct end face 82 toward the upstream end or location of threshing drum 60, and so as to direct end face 83 toward the downstream end or location of threshing drum 60, whereby in response to rotation of threshing drum 60 in the threshing direction of rotation threshing bar 70 leads with leading edge 80 and trails with trailing end 81 and a crop applied between cylindrical exterior 61 of threshing drum 60 and thresher concave 51 is threshed by and between thresher concave 51 and spike 110 and top threshing side 84 of threshing bar 70. Bottom threshing drum emplacement side 85 of threshing bar 70 is contoured to be received by cylindrical exterior 61 of threshing drum 60.

In the installation of nut-and-bolt assembly 122 as shown in FIG. 11, head 127 is set into and is received by counterbore 121 such that it is located under top threshing side 84 so as not to interfere with the threshing action carried out by grooves 100 and corresponding vanes 101 formed in top threshing side 84. Shank 126 extends downwardly from head 127 through bore 120 and into and through cavity 123 to threaded end 128, which is applied through an opening 129 formed through threshing drum 60. Nut 124 is threaded onto threaded end 128 of shank 126 along the underside of threshing drum 60 and is tightened to firmly and rigidly secure threshing bar 70 in place relative to cylindrical exterior 61 of threshing drum 60.

A population of threshing bars 70 is emplaced and affixed to cylindrical exterior of threshing drum 60, as generally depicted in FIGS. 9 and 10, to form an exemplary thresher 50 according to the principle of the invention. In FIG. 9, threshing bars are denoted at 70, and are shown set onto cylindrical exterior 61 of threshing drum 60 in preparation for threshing. Threshing bars 70 are positioned with their leading edges 80 and leading threshing faces 91 and threshing surfaces 115A of spikes 110 facing or otherwise directed into the threshing direction of rotation of threshing drum 60 indicated by arrowed line A so to direct their end faces 82 toward the upstream location 50A of threshing drum 60, and so as to direct their end faces 83 toward the downstream location 50B of threshing drum 60. Because end faces 82 of threshing bars 70 are directed toward upstream location of threshing drum 60, the oblique crop material deflecting surfaces of threshing bars 70, end faces 82, also face upstream location 50A of threshing drum 60, and is oblique and angled toward upstream location 50A of threshing drum 60 relative to the threshing direction of rotation of threshing drum 60 as indicated by arrowed line A. In response to rotation of threshing drum 60 in the threshing direction of rotation denoted by arrowed line A, threshing bars 70 lead with their leading edges 80 and trail with their trailing ends 81 and crop cuttings applied between cylindrical exterior 61 of threshing drum 60 and thresher concave 51 are threshed by and between spike 110 and the rasp structures formed in the top threshing sides 84 of threshing bars 70 and thresher concave 51 separating the grains from the chaff to form threshings, namely, the chaff and the separated grains. In the customary operation of the combine harvester, the grains fall through sieves 57 in FIG. 10 into the collection tank inside the combine harvester.

In FIGS. 9, 10, and 11, as each threshing bar 70 is rotated by threshing drum 60 along the threshing direction of rotation the crop cuttings to be threshed are received between top threshing side 84 of threshing bar 70 and thresher concave 51, in which the crop cuttings to be threshed are applied to and across top threshing side 84 and encounter top threshing side 84 from leading edge 80 to trailing end 81 and impact leading threshing face 91 and spike 110 and impact and encounter the rasp structure consisting of grooves 100 and corresponding vanes 101 applied along leading threshing face 91 and trailing threshing face 90 imparting a threshing action against the crop cuttings to form threshings. The previously described incline of leading threshing face 91 relative to trailing threshing face 90, and the grooves 100 and corresponding vanes 101 forming the rasp structure along leading threshing face 91 and trailing threshing face 90 cooperate to cause threshing bar 70 to perform an aggressive threshing of the crop cuttings to be threshed. In fact, leading threshing face 91 faces upwardly toward thresher concave 51 and faces into the threshing direction of rotation of threshing drum 60 indicated by arrowed line A and inclines downwardly from trailing threshing face 90 to cylindrical exterior 61 of threshing drum 60 at an average downward incline of 40 degrees relative to trailing threshing face 90, and in response to rotation of threshing drum 60 in the threshing direction of rotation crop cuttings initially impact leading threshing face 91 at a steep and oblique impaction angle of 50-60 degrees and the defined incline of leading threshing face 91 as described thus provides an aggressive initial impaction against the crop cuttings in the threshing of such crop cuttings but not so aggressive so as to cause an initial over-threshing of the crop cuttings. The crop cuttings and threshings are forced along the vanes 101 and into and through the grooves 100 defining the crop material conveyance pathways of the rasp structure of threshing fixture 71 in a rearward direction from leading edge 80 to trailing end 81 and further in an angled direction from end face 83 of fixture 71 to trailing end 81 of fixture 71 and are thrust outwardly therefrom toward upstream location 50A of threshing drum 60 and away from end face 82, in response to movement of threshing bar 70 along the threshing direction of rotation of threshing drum 60 leading with leading edge 80. This thrusting of crop cuttings and threshings along and through the crop material conveyance pathways defined by the rasp structure of threshing fixture 71 toward upstream location 50A of threshing drum slows the conveyance of this material along thresher 50 from upstream location 50A to downstream location 50B thereby prolonging the applied threshing action to the crop cuttings to provide a thorough, repeated, more prolonged, and aggressive threshing of the crop cuttings to be threshed as thresher 50 rotates. And so the rasp structure formed by grooves 100 and corresponding vanes 101 creates contact of the crop cuttings against the concave allowing more crop cuttings to rub together, and the rasp structure is aggressive and yet gentle on the crop cuttings to allow the crop cuttings to be managed through and along the crop material conveyance pathways formed by grooves 100 and corresponding vanes 101. The rasp structure of threshing fixture 71 defined by grooves and corresponding vanes 101 as herein described reduces the possibility of over-threshing, prevents cracks and splits in seed coats, and is suitable for all crops, and especially corn, beans, and small grain crops.

In response to rotation of threshing drum 60 in the threshing direction of rotation denoted by arrowed line A, threshing bars 70 lead with their leading edges 80 and trail with their trailing ends 81 and crop cuttings applied between cylindrical exterior 61 of threshing drum 60 and thresher concave 51 are threshed by and between top threshing sides 84 of threshing bars 70 and thresher concave 51 separating the grains from the chaff to form threshings, namely, the chaff and the separated grains. In response to rotation of threshing drum 60 in the threshing direction of rotation denoted by arrowed line A, threshing surface 115A of each spike 110 threshes or otherwise spike-threshes crop cuttings applied between cylindrical exterior 61 of threshing drum 60 and thresher concave 51 between corner 92 and trailing end 81 of fixture 71 proximate to trailing threshing face 90. Spike 110 is thus especially useful for spike-threshing crops, via threshing surface 115A of head 115, such as rice and other crops having inherently tough straw. Spike 110 leads with head 115, specifically threshing surface 115A, the leading threshing surface of spike 110, which takes the brunt of the oncoming crop cuttings and prevents the premature wear of the remainder of spike 110 due to the comparatively greater tensile strength of head 115 relative to spike 110, in accordance with the principle of the invention. Because spike 110 projects from trailing threshing face 90 of top threshing side 84 of fixture 71, spike 110 takes the brunt of the oncoming crop material and is inherently prone to wear more quickly than the remainder of fixture 71. Because spike 110 leads with head 115 having an inherent tensile strength greater than the inherent tensile strength of fixture 71, head 115 reinforces spike 110 and inherently isolates leading end 113 of spike 110 covered by head 115 from the oncoming crop material and has a greater resistance to wear compared to the remainder of fixture 71, which prolongs the useful life of threshing bar 70 until the remaining rasp structure of threshing bar 70 becomes sufficiently worn to require bar replacement. Being reinforced with head 115, spike 110 is a reinforced spike. A conveyance (not shown) of combine harvester 50, such as an auger, conveys the threshings along the rotating thresher 50 from upstream location 50A of thresher 50 to downstream location 50B of thresher 50 where the grains fall through sieves 57 into the collection tank of the combine harvester. The provision of spike 110 reinforced with head 115 that spike-threshes the crop cuttings allows thresh bar 70, and also other thresh bars, to more efficiently thresh crops such as wheat, barley, and rice having tough straw.

FIG. 9 illustrates a population of threshing bars 70 applied to cylindrical exterior 61 of threshing drum 60 in a pattern extending between upstream location 50A of thresher 50 and downstream location 50B of thresher 50. As each threshing bar 70 is rotated along the threshing direction of rotation, it is to be emphasized that part of the crop cuttings to be threshed impacts the oncoming oblique crop material deflecting surface, end face 82, which deflects the crop cuttings outwardly therefrom toward upstream location 50A of threshing drum 60 and away from end face 82. This deflection of crop cuttings toward upstream location 50A of threshing drum 60 as deflected by end face 82 further slows the conveyance of this material along thresher 50 from upstream location 50A to downstream location 50B thereby prolonging the applied threshing action to the crop cuttings to provide a thorough, repeated, more prolonged, and aggressive threshing of the crop cuttings to be threshed as thresher 50 rotates.

Threshing bar 70 incorporating spike 110 incorporates a particular type of rasp structure that is structured to perform a crop-threshing function. The rasp structure of threshing bar 70 is instructive of a particular type of rasp structure in a threshing bar incorporating spike 11 and that top threshing side 84 of threshing bar 70 can be configured with other configurations of rasp structures.

Figure 12:
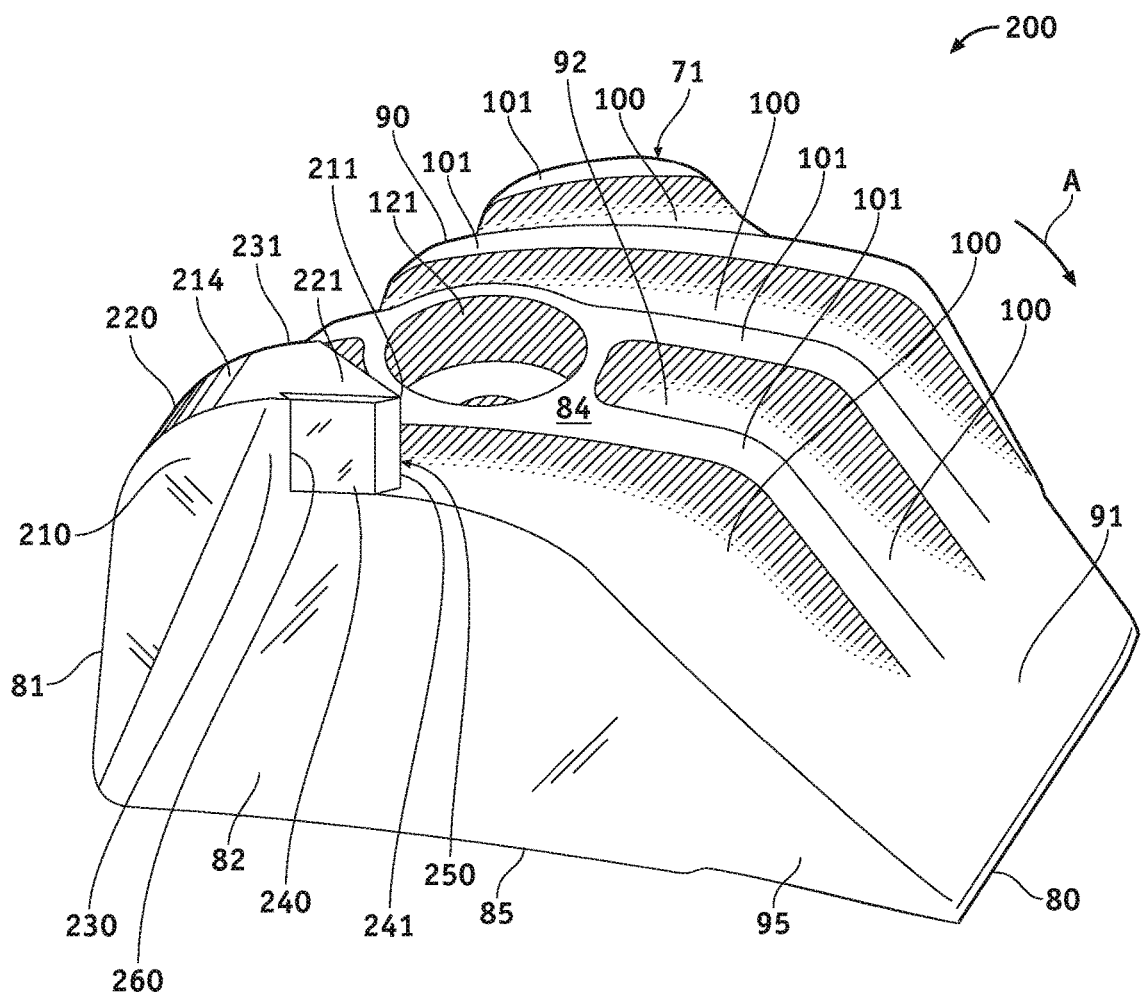
FIG. 12 is a front perspective view of an alternate embodiment of a threshing bar according to the invention.
Figure 13:
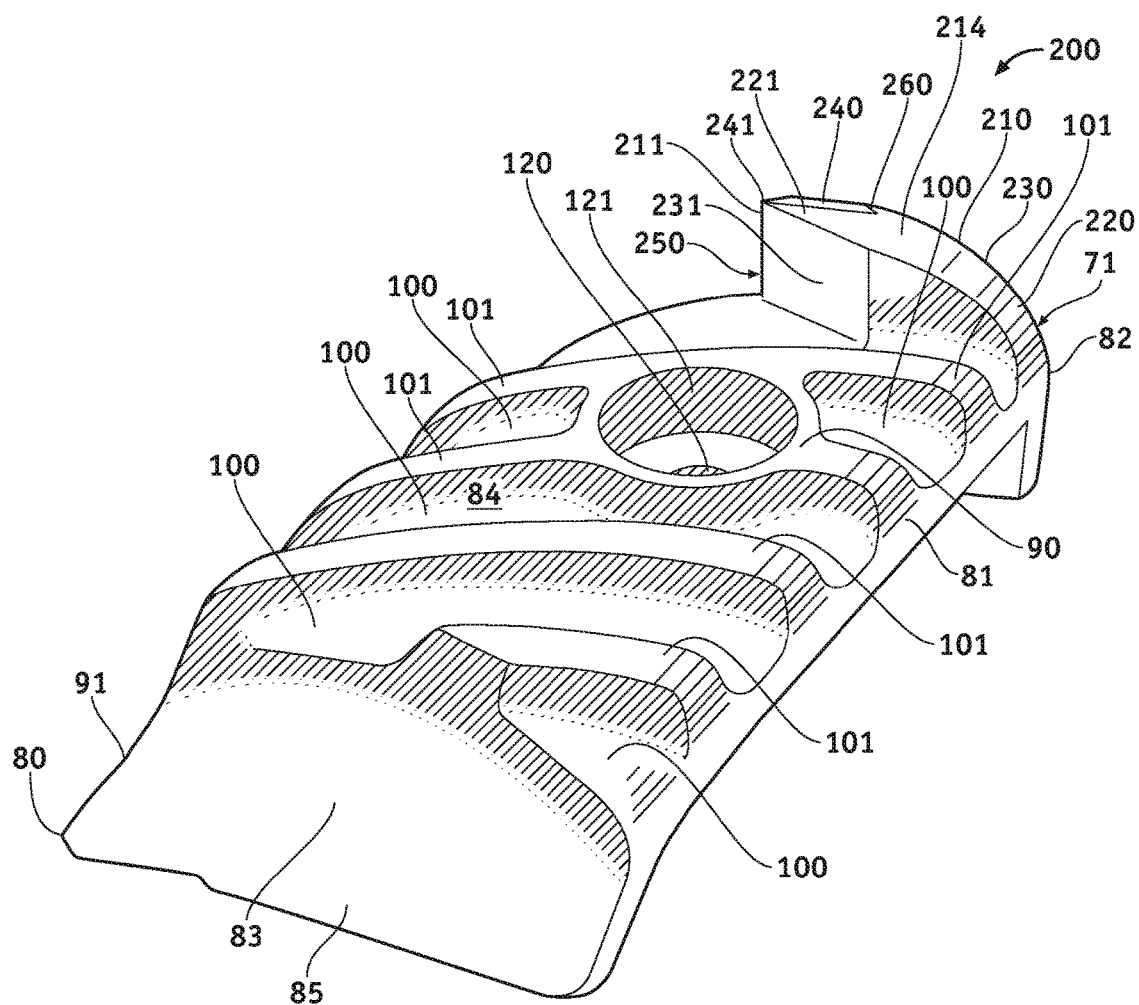
FIG. 13 is a rear perspective view of the embodiment of FIG. 12.
Figure 14:
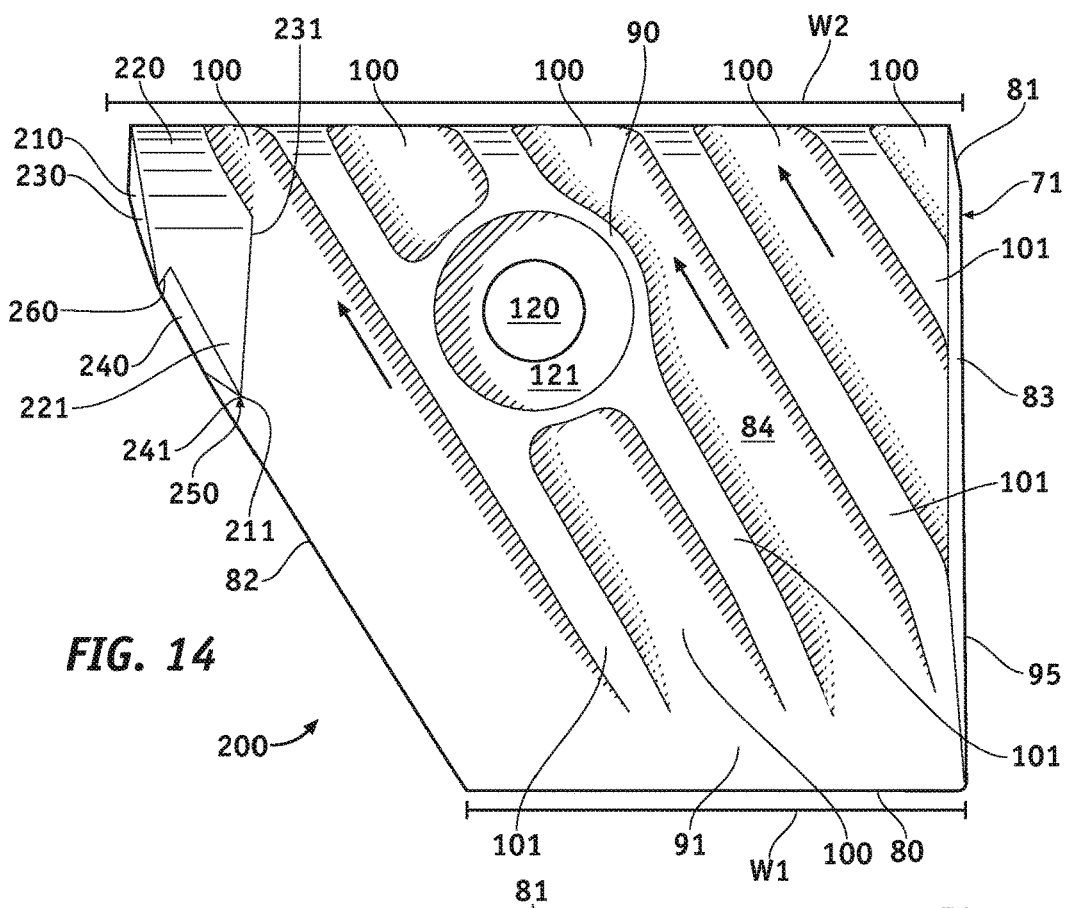
FIG. 14 is a top plan view of the embodiment of FIG. 12.
Figure 15:
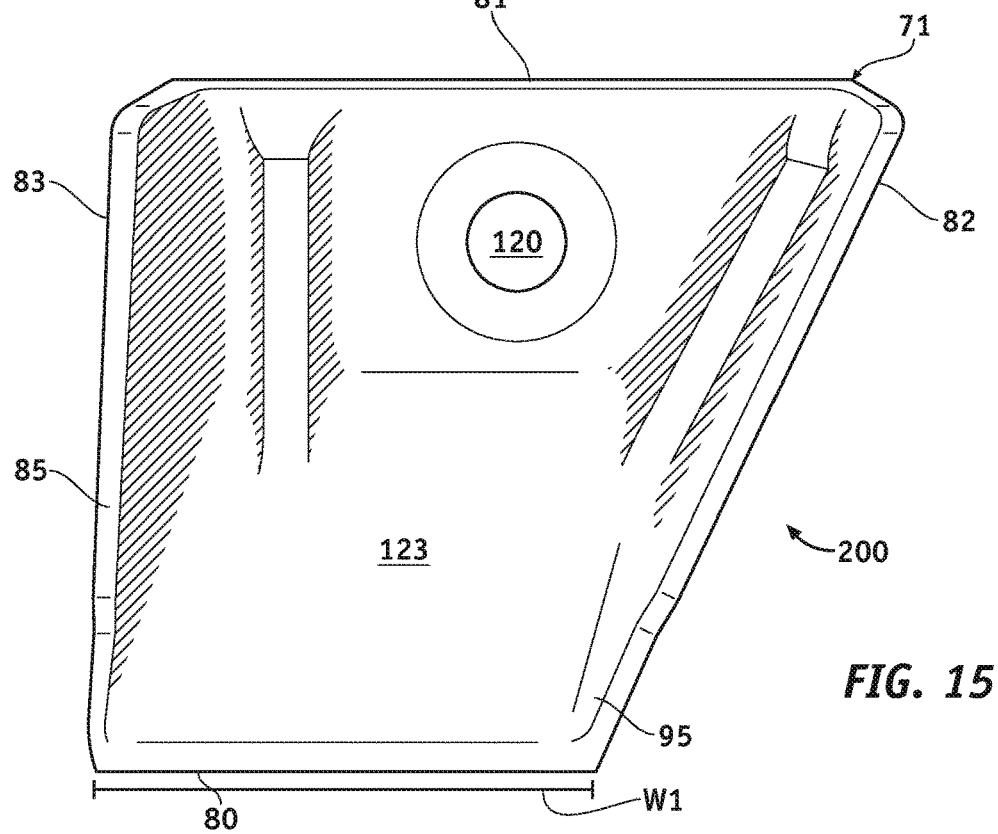
FIG. 15 is a bottom plan view of the embodiment of FIG. 12.
Figure 16:
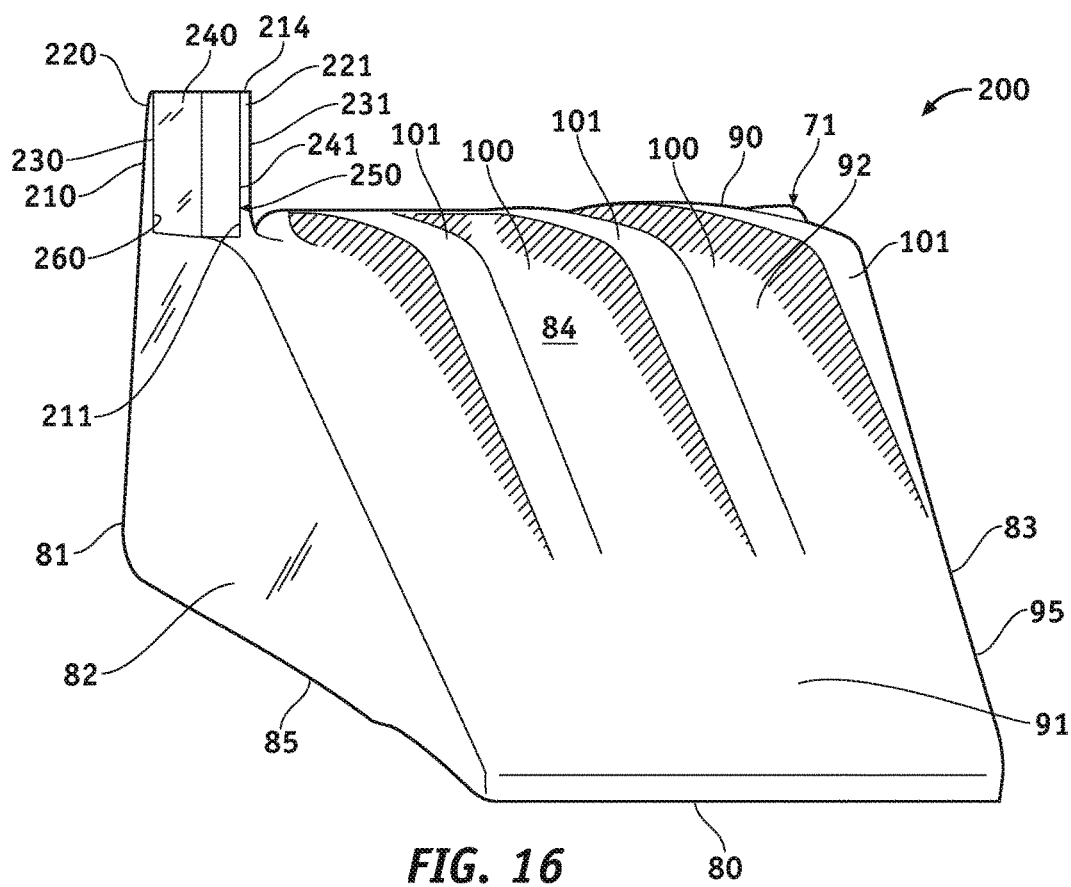
FIG. 16 is a front elevation view of the embodiment of FIG. 12.
Figure 17:
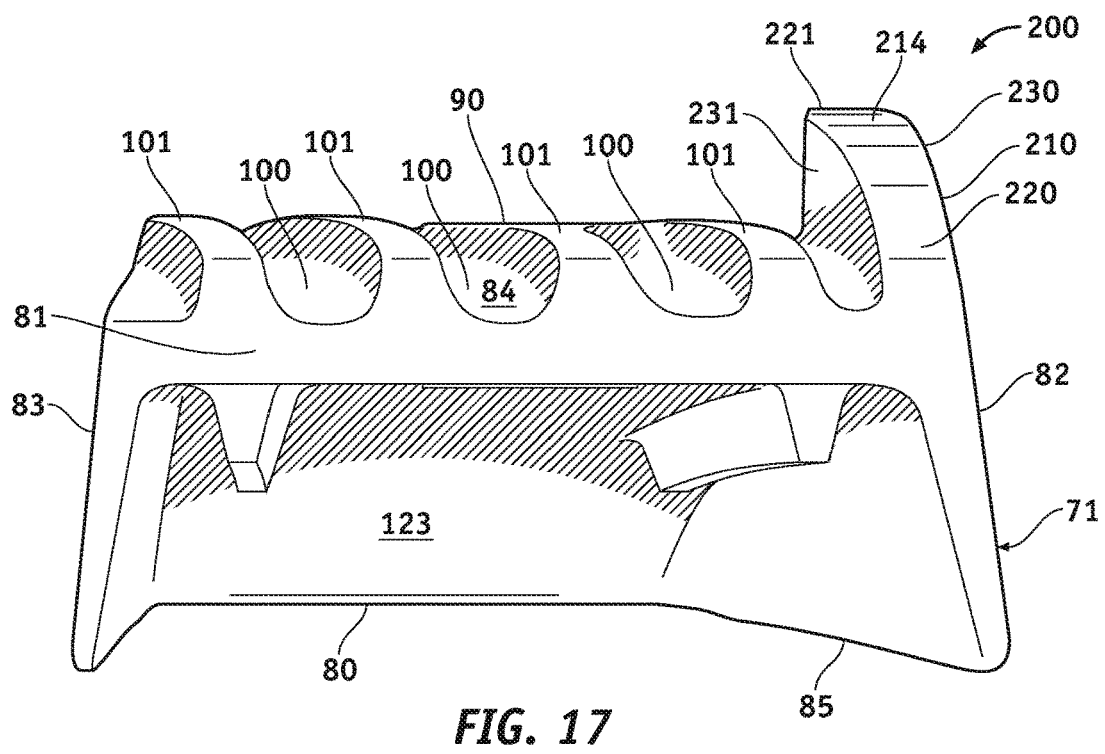
FIG. 17 is a rear elevation view of the embodiment of FIG. 12.
Figure 18:
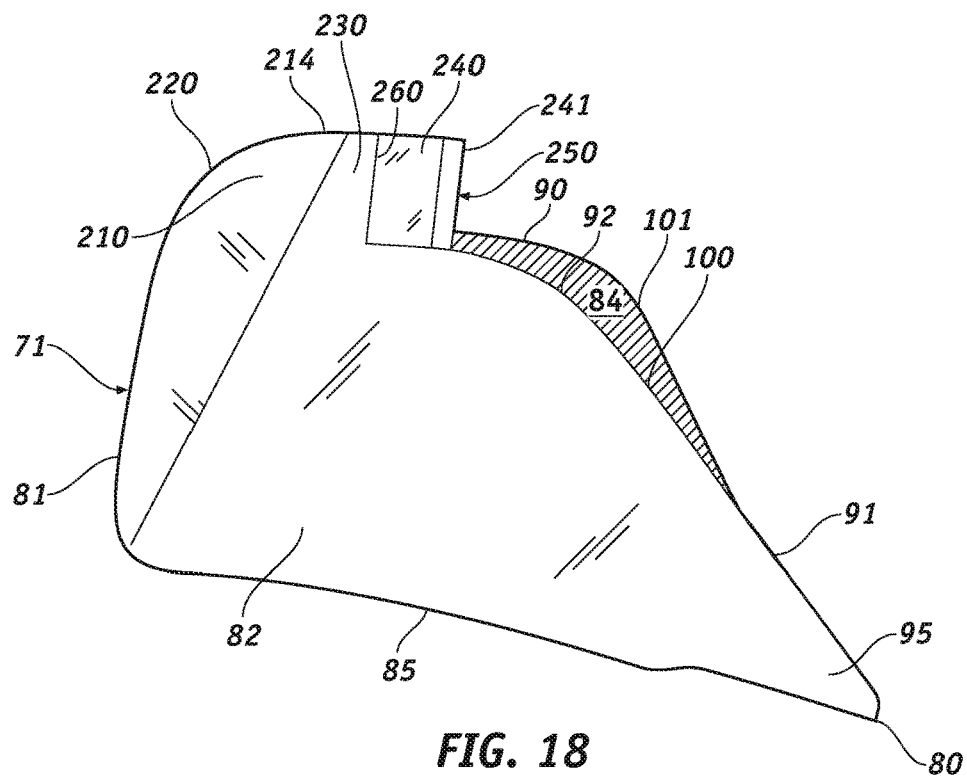
FIG. 18 is a right side elevation view of the embodiment of FIG. 12.
Figure 19:
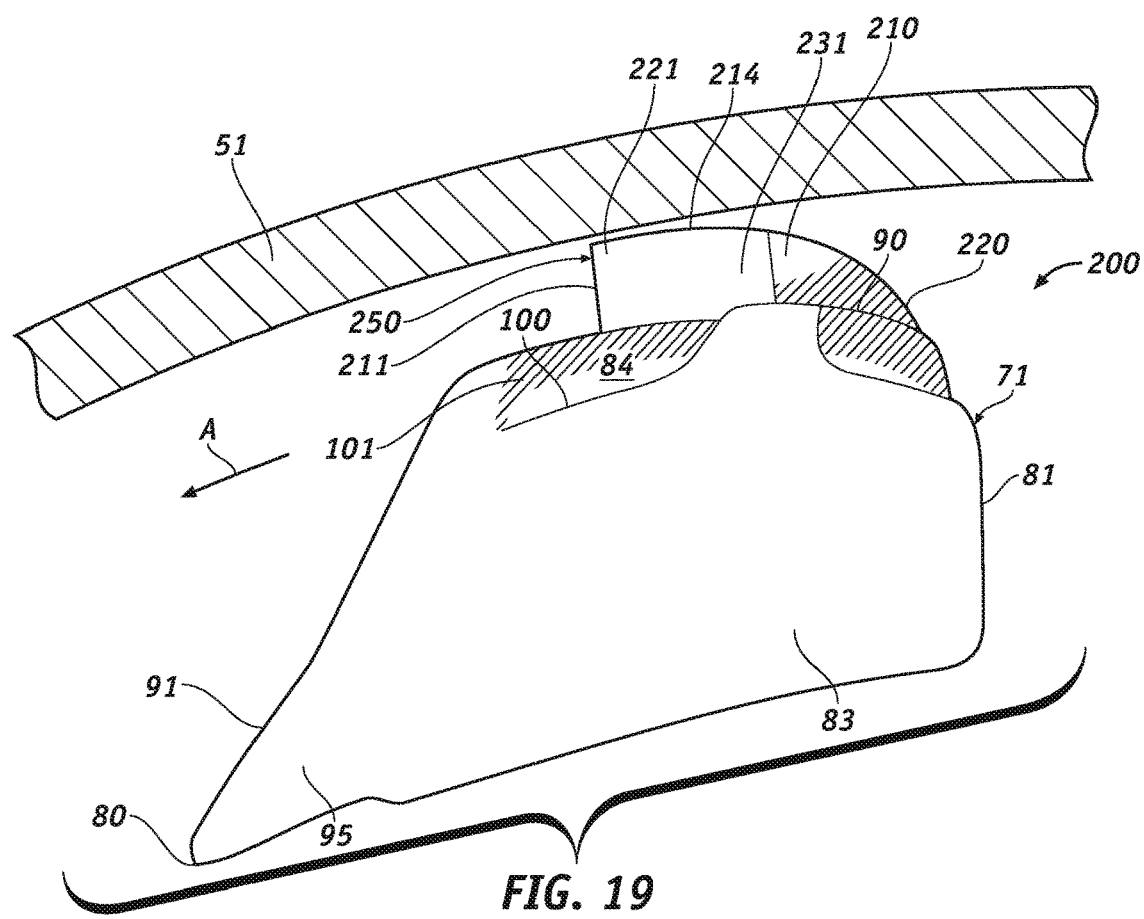
FIG. 19 is a left side elevation view of the embodiment of FIG. 12 shown as it would appear operatively positioned adjacent to a section view of a thresher concave.

FIGS. 12-19 illustrate yet still another embodiment of a threshing bar 200 constructed and arranged in accordance with the principle of the invention. FIG. 12 is a front perspective view of threshing bar 200, and a population of which in a particular embodiment is applied to cylindrical exterior 61 of the previously-discussed threshing drum 60 being then part of thresher 55 forming an exemplary thresher embodiment of the invention. FIG. 13 is a rear perspective view of threshing bar 200, FIG. 14 is a top plan view of threshing bar 200, FIG. 15 is a bottom plan view of threshing bar 200, FIG. 16 is a front elevation view of threshing bar 200, FIG. 17 is a rear elevation view of threshing bar 200, FIG. 18 is a right or upstream side elevation view of threshing bar 200, and FIG. 19 is a left or downstream side elevation view of threshing bar 200 shown as it would appear operatively positioned with respect to a section view of thresher concave 51.

Referencing FIGS. 12-19 in relevant part, threshing bar 200 is somewhat different from threshing bar 70 in overall shape in that it is formed with a sharpened spike or cutting blade denoted at 210, but in structure is common to threshing bar 70 in that threshing bar 200 shares fixture 71, including leading edge 80 having width W1, trailing end or extremity 81 having width W2 that is greater than width W1 of leading edge 80, upstream face 82, downstream face 83, top threshing side 84, bottom threshing drum emplacement side 85, trailing threshing face 90, leading threshing face 91, corner 92, wedge 95, grooves 110 and corresponding vanes 111, bore 120 and corresponding counterbore 121 to accommodate a nut-and-bolt fastener for securing threshing bar 200 to cylindrical exterior 61 of threshing drum 60 referenced in connection with threshing bar 70 in FIG. 11, and cavity 123. Leading edge 80 defines the leading extremity of threshing fixture 71.

Threshing bar 200 is a spiked threshing bar in that it is formed with spike 210. In contrast with spike 110 of threshing bar 70, which spike 110 has a blunt crop-threshing end defined by head 115, specifically threshing surface 115A of head 115, spike 210 of threshing bar 200 is sharpened in comparison, having cutting edge 211 adapted to cut crop cuttings. Spike 210 is formed in threshing fixture 71. Spike 210 projects or otherwise extends outwardly from top threshing side 84 of threshing fixture 71 relative to the rasp structure formed in top threshing side 94, grooves 100 and vanes 101 in this example, to top 214. More specifically, spike 210 projects or otherwise extends outwardly from trailing threshing face 90 relative to the rasp structure formed in trailing and leading faces 90 and 91 to top 214, from trailing end 81 to an intermediate location between trailing end 81 and corner 92 so as to be available for threshing crop cuttings between upstream and trailing ends 80 and 81 and, more particularly, between trailing end 81 and corner 92.

Spike 210 is parallel with respect to end face 82 and end face 83. Spike 210 is formed at and along end face 82 of threshing fixture 71. Spike 210 has a rearward or trailing end 220, and an opposed forward or leading end 221, which is sharpened being formed with cutting edge 211. Trailing and leading ends 220 and 221 are integral with one another and are integrally formed with threshing fixture 71 and together project from top threshing side 84 of threshing fixture 71 to top 214 of spike 210. Trailing and leading ends 220 and 221 are formed along trailing threshing face 90 of top threshing side 84 of threshing fixture 71, and project outwardly from, or otherwise with respect to, trailing threshing face 90 from trailing 220 end proximate to trailing end 81 to cutting edge 211 of leading end 221 at an intermediate location between trailing end 81 and corner 92. Accordingly, cutting edge 211 of leading end 221 is between leading edge 80 and trailing end 81, and, more specifically, between trailing end 81 and corner 92, and projects outwardly from trailing threshing face 90 to top 214 and forwardly toward corner 92 and towards leading edge 80 so as to be available for cutting.

Spike 210 includes an upstream side 230 and an opposed downstream side 231 that extend from trailing end 220 to leading end 221. Upstream side 230 is an extension of end face 82, and downstream side 231 faces oppositely toward the rasp structure of fixture 71. Upstream 230 and downstream sides 231 taper inwardly and forwardly toward one another along leading end 231 to cutting edge 211, which projects outwardly from trailing threshing face 90 to top 214 so as to be available for cutting.

Threshing bar 200 further includes a head 240. Head 240 is formed entirely of metal that is not only different from the metal of fixture 71 but that also has an inherent tensile strength that is greater than the inherent tensile strength of the metal that forms the entirety of fixture 71. As explained above, the metal that forms the entirety of fixture 71 is cast iron, specifically grey cast iron having an inherent tensile strength of from 200 MPa to 300 MPa. The metal that forms the entirety of head 240 is tungsten carbide having an inherent tensile strength of 344 MPa. Accordingly, the inherent tensile strength of head 240, of the metal that forms the entirety of head 240, is greater than the inherent tensile strength of fixture 71, of the metal that forms the entirety of fixture 71.

Head 240, a threshing element, is formed with cutting edge 241. Head 240 is affixed rigidly to the tapered part of upstream side 230 of leading end 231 that tapers inwardly in the direction of end face 83 away from end face 82 to cutting edge 211, and extends forwardly along upstream side 230 of leading end 221 toward or otherwise in the direction of corner 92 and leading edge 80 to cutting edge 241 between leading edge 80 and trailing end 81, and, more particularly, between corner 92 and trailing end 81. Cutting edge 241 of head 240 merges with, and is coextensive with, cutting edge 211 of spike 210 so as to form aggressive cutting edge denoted at 250. Cutting edges 211 and 241 cooperate to form aggressive cutting edge 250. Spike 210 leads with aggressive cutting edge 250. In other words, aggressive cutting edge 250 is the leading cutting edge of spike 210. Cutting edges 211 and 241 concurrently project outwardly from trailing threshing face 90 to top 214 between leading edge 80 and trailing end 81, and, more particularly, between corner 92 and trailing end 80, and forwardly toward corner 92 to be available for cutting. Aggressive cutting edge 250, in turn, projects outwardly from trailing threshing face 90 to top 214 between leading edge 80 and trailing end 81, and, more particularly, between corner 92 and trailing end 81, and forwardly toward corner 92 and leading edge 80 to be available for cutting crop cuttings between leading edge 80 and trailing end 81, and, more particularly, between corner 92 and trailing end 81. Head 240, a thin, flat body, is affixed rigidly to upstream side 230 of leading end 221 via welding. In this example, head 240 is fitted into notch 260 formed in upstream side 230 of leading end 221 of spike 210 and is affixed rigidly to notch 260 via welding.

Threshing bar 200 is applied and secured to a cylindrical exterior of a threshing drum and positioned in the same way as threshing bar 70 previously discussed and which is shown in FIG. 11, whereby threshing side 84 of threshing bar 200 and the rasp structure formed therein and spike 210 faces outwardly toward and confronts thresher concave 51. A threshing drum may be formed with a population of threshing bars 200 applied in a regular or preselected pattern across the cylindrical exterior. As with threshing bar 70 discussed in reference to FIGS. 9 and 10 in reference to threshing drum 60, in a particular embodiment threshing bars 200 are set onto cylindrical exterior 61 of threshing drum 60 in preparation for threshing. Threshing bars 200 are positioned with their leading edges 80 and leading threshing faces 91 and aggressive cutting edge 250 directed into the threshing direction of rotation of threshing drum 60 indicated by arrowed line A in FIG. 19 so to direct their upstream faces 82 toward the upstream location 50A of threshing drum, and so as to direct their downstream faces 83 toward the downstream location 50B of threshing drum 60 in reference to FIG. 9. Because upstream faces 82 of threshing bars 200 are directed toward upstream location of threshing drum 60, the oblique crop material deflecting surface defined by upstream face 82 of each threshing bar 200 also faces upstream location 50A of threshing drum 60, and is oblique and angled toward upstream location 50A of threshing drum 60 relative to the threshing direction of rotation of threshing drum 60 as indicated by arrowed line A. In response to rotation of threshing drum 60 in the threshing direction of rotation denoted by arrowed line A threshing bars 200 lead with their leading edges 80 and trail with their trailing ends 81 and crop cuttings applied between cylindrical exterior 61 of threshing drum 60 and thresher concave 51 are threshed by and between top threshing sides 84 of threshing bars 200 and thresher concave 51 separating the grains from the chaff to form threshings, namely, the chaff and the separated grains. In response to rotation of threshing drum 60 in the threshing direction of rotation denoted by arrowed line A threshing bars 200 lead with their leading edges 80 and trail with their trailing ends 81 and crop cuttings applied between cylindrical exterior 61 of threshing drum 60 and thresher concave 51 are further cut by aggressive cutting edge 250 of spike 210 directed into the threshing direction of rotation to form cuttings from the crop cuttings that are further threshed by and between top threshing sides 84 of threshing bars 200 and thresher concave 51 separating the grains from the chaff to form threshings, namely, the chaff and the separated grains. And so threshing bar 200 is not only adapted to perform threshing, it is also adapted to cut crop cuttings with aggressive cutting edge 250 of spike 210 to form cuttings from the crop cuttings, in accordance with the principle of the invention.

As each threshing bar 200 is rotated by threshing drum 60 along the threshing direction of rotation the crop cuttings to be threshed are received between top threshing side 84 of threshing bar 200 and thresher concave 51, in which the crop cuttings to be threshed are applied to and across top threshing side 84 and encounter top threshing side 84 from leading edge 80 to trailing end 81 and impact leading threshing face 91 and spike 210 and impact and encounter the rasp structure consisting of grooves 100 and corresponding vanes 101 applied along leading threshing face 91 and trailing threshing face 90 imparting a threshing action against the crop cuttings to form threshings. The previously described incline of leading threshing face 91 relative to trailing threshing face 90, and the grooves 100 and corresponding vanes 101 forming the rasp structure along leading threshing face 91 and trailing threshing face 90 cooperate to cause threshing bar 200 to perform an aggressive threshing of the crop cuttings to be threshed. Again, leading threshing face 91 faces upwardly toward thresher concave 51 and faces into the threshing direction of rotation of threshing drum 60 indicated by arrowed line A and inclines downwardly from trailing threshing face 90 to cylindrical exterior 61 of threshing drum 60, and in response to rotation of threshing drum 60 in the threshing direction of rotation crop cuttings initially impact leading threshing face 91 at a steep and oblique impaction angle and the defined incline of leading threshing face 91 as described thus provides an aggressive initial impaction against the crop cuttings in the threshing of such crop cuttings but not so aggressive so as to cause an initial over-threshing of the crop cuttings. The crop cuttings and threshings are forced along the vanes 101 and into and through the grooves 100 defining the crop material conveyance pathways of the rasp structure of threshing fixture 71 in a rearward direction from leading edge 80 to trailing end 81 and further in an angled direction from end face 83 of fixture 71 to trailing end 81 of fixture 71 and are thrust outwardly therefrom toward upstream location 50A of threshing drum 60 and away from end face 82, in response to movement of threshing bar 200 along the threshing direction of rotation of threshing drum 60 leading with leading edge 80. This thrusting of crop cuttings and threshings along and through the crop material conveyance pathways defined by the rasp structure of threshing fixture 71 toward upstream location 50A of threshing drum slows the conveyance of this material along thresher 50 from upstream location 50A to downstream location 50B thereby prolonging the applied threshing action to the crop cuttings to provide a thorough, repeated, more prolonged, and aggressive threshing of the crop cuttings to be threshed as thresher 50 rotates. And so the rasp structure formed by grooves 100 and corresponding vanes 101 creates contact of the crop cuttings against the concave allowing more crop cuttings to rub together, and the rasp structure is aggressive and yet gentle on the crop cuttings to allow the crop cuttings to be managed through and along the crop material conveyance pathways formed by grooves 100 and corresponding vanes 101. The rasp structure of threshing fixture 71 defined by grooves and corresponding vanes 101 as herein described reduces the possibility of over-threshing, prevents cracks and splits in seed coats, and is suitable for all crops, and especially corn, beans, and small grain crops.

In response to rotation of threshing drum 60 in the threshing direction of rotation denoted by arrowed line A, threshing bars 200 lead with their leading edges 80 and trail with their trailing ends 81 and crop cuttings applied between cylindrical exterior 61 of threshing drum 60 and thresher concave 51 are threshed by and between top threshing sides 84 of threshing bars 200 and thresher concave 51 separating the grains from the chaff to form threshings, namely, the chaff and the separated grains. In response to rotation of threshing drum 60 in the threshing direction of rotation denoted by arrowed line A, aggressive cutting edge 250 of spike 210 of each threshing bar 200 cuts crop cuttings applied between cylindrical exterior 61 of threshing drum 60 and thresher concave 51 between corner 92 and trailing end 81 of fixture 71 proximate to trailing threshing face 90. Spike 210 is especially useful for threshing crops such as rice and other crops having inherently tough straw. Spike 210 leads with aggressive cutting edge 250, which takes the brunt of the oncoming crop cuttings. Because head 240 is fashioned of a metal having an inherent tensile strength that is greater than the inherent tensile strength of fixture 71, head 240, including cutting edge 241 of head 240, reinforces cutting edge 211 of spike 210 and inherently resists wear relative to cutting edge 211 of spike 210, enabling cutting edge 241 to perform the cutting even when cutting edge 211 experiences wear and recedes from cutting edge 241, and has a greater resistance to wear compared to the remainder of fixture 71, which inherently prolongs the useful life of threshing bar 200 until the remaining rasp structure of threshing bar 200 becomes sufficiently worn to require bar replacement. Being reinforced with head 240, spike 210 is a reinforced spike or cutting blade. A conveyance (not shown) of combine harvester 50, such as an auger, conveys the threshings along the rotating thresher 50 from upstream location 50A of thresher 50 to downstream location 50B of thresher 50 where the grains fall through sieves 57 into the collection tank of the combine harvester. The provision of spike 210 reinforced with head 240 forming aggressive cutting edge 241 that cuts the crop cuttings, allows thresh bar 200, and also other thresh bars, to more efficiently thresh crops such as wheat, barley, and rice having tough straw.

The invention has been described above with reference to illustrative embodiments. However, those skilled in the art will recognize that changes and modifications may be made to the embodiments without departing from the nature and scope of the invention. Various changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A threshing bar, comprising:
a threshing fixture, formed entirely of a first metal, includes a leading extremity, a trailing extremity, a top threshing side, a bottom threshing drum emplacement side, a trailing threshing face, and a spike that is sharpened to a first cutting edge, the spike projects outwardly from the top threshing side to a top of the spike, the spike includes opposite sides that taper forwardly toward the leading extremity to the first cutting edge between the leading and trailing extremities and that projects outwardly from the trailing threshing face to the top of the spike;
a head, formed entirely of a second metal, sharpened to a second cutting edge, the head is affixed rigidly to one of the opposed sides of the spike, the head extends forwardly along the one of the opposed sides of the spike toward the leading extremity to the second cutting edge between the leading and trailing extremities; the second cutting edge merges with first cutting edge, and the first cutting edge and second cutting edge are coextensive, concurrently project outwardly from the trailing threshing face to the top of the spike, and cooperate to form an aggressive cutting edge, the spike further leads with the aggressive cutting edge that is between the leading and trailing extremities and that extends outwardly from the trailing threshing face to the top of the spike for cutting crop cuttings between the leading and trailing extremities;
the first metal has a first tensile strength;
the second metal is different from the first metal and has a second tensile strength; and
the second tensile strength is greater than the first tensile strength.

2. The threshing bar according to claim 1, wherein the head is fitted into a notch formed in the one of the opposed sides of the spike.

3. The threshing bar according to claim 1, wherein the first metal is cast iron.

4. The threshing bar according to claim 3, wherein the second metal is tungsten carbide.

* * * * *